US005737478A

United States Patent [19]
Yamagishi et al.

[11] Patent Number: 5,737,478
[45] Date of Patent: Apr. 7, 1998

[54] RECORDING APPARATUS FOR RECORDING A FIRST AND A SECOND INFORMATION SIGNAL

[75] Inventors: Yoichi Yamagishi; Hiroyuki Horii, both of Tokyo, Japan

[73] Assignee: Canon Kabushiki Kaisha, Tokyo, Japan

[21] Appl. No.: 458,231

[22] Filed: Jun. 2, 1995

Related U.S. Application Data

[63] Continuation of Ser. No. 236,654, Apr. 29, 1994, abandoned, which is a continuation of Ser. No. 879,145, Apr. 30, 1992, abandoned, which is a continuation of Ser. No. 566,883, Aug. 13, 1990, abandoned, which is a continuation of Ser. No. 192,956, May 12, 1988, abandoned.

[30] Foreign Application Priority Data

May 15, 1987 [JP] Japan ................................ 62-119302
May 15, 1987 [JP] Japan ................................ 62-119312

[51] Int. Cl.⁶ .................................................... H04N 5/928
[52] U.S. Cl. ........................................... 386/95; 386/105
[58] Field of Search ................................ 358/342, 335, 358/341, 343, 311; 360/19.1, 13, 33.1, 35.1, 27, 14.1, 66; 386/95, 96, 97, 107, 125, 92, 105, 106; 369/32; H04N 5/76, 5/928

[56] References Cited

U.S. PATENT DOCUMENTS

| | | | |
|---|---|---|---|
| 3,258,754 | 6/1966 | Cabor | 360/27 |
| 4,496,997 | 1/1985 | Ohtsuki | 360/13 |
| 4,523,304 | 6/1985 | Satoh et al. | 358/335 |
| 4,541,021 | 9/1985 | Konishi et al. | 358/335 |
| 4,544,960 | 10/1985 | Konishi | 358/335 |
| 4,567,531 | 1/1986 | Tabata | 358/335 |
| 4,571,641 | 2/1986 | Fujiki et al. | 358/341 |
| 4,574,319 | 3/1986 | Konishi | 358/335 |
| 4,575,772 | 3/1986 | Shimada et al. | 360/33.1 |
| 4,587,576 | 5/1986 | Hirota et al. | 358/335 |
| 4,602,295 | 7/1986 | Moriyama et al. | 358/341 |
| 4,602,296 | 7/1986 | Murakoshi | 358/341 |
| 4,694,357 | 9/1987 | Rahman et al. | 358/335 |
| 4,740,846 | 4/1988 | Ogawa | 360/66 |
| 4,746,993 | 5/1988 | Tada | 358/335 |
| 4,754,339 | 6/1988 | Nagai et al. | 358/342 |
| 4,772,960 | 9/1988 | Takahashi et al. | 360/8 |
| 4,777,537 | 10/1988 | Ueno et al. | 358/341 |
| 4,779,252 | 10/1988 | Cusrers et al. | 369/47 |
| 4,791,622 | 12/1988 | Clay et al. | 360/27 |
| 4,794,474 | 12/1988 | Dwyer et al. | 365/27 |
| 4,814,904 | 3/1989 | Shigihara et al. | 360/66 |
| 4,816,928 | 3/1989 | Sasaki et al. | 360/19.1 |
| 4,858,031 | 8/1989 | Fukurta | 358/906 |
| 5,053,898 | 10/1991 | Hashimoto et al. | 360/72.1 |

*Primary Examiner*—Thai Tran
*Assistant Examiner*—Huy Nguyen
*Attorney, Agent, or Firm*—Robin, Blecker & Daley

[57] ABSTRACT

A recording and/or reproducing apparatus for recording a video signal on a medium comprises a recording device which is arranged to set a sound recording track by recording a predetermined signal in the track during video signal recording, and a circuit which is arranged to determine a block on said medium to be a sound recording track when an identification signal indicative of a sound recording block is detected from the block.

10 Claims, 9 Drawing Sheets

RECORDING APPARATUS FOR RECORDING A FIRST AND A SECOND INFORMATION SIGNAL

This is a continuation application under 37 CFR 1.62 of prior application Ser. No. 08/236,654, filed Apr. 29, 1994, abandoned, which is a continuation of Ser. No. 07/879,145, filed Apr. 30, 1992 abandoned, which is a continuation of Ser. No. 07/566,883, filed Aug. 13, 1990, abandoned, which is a continuation of Ser. No. 07/192,956, filed May 12, 1988, abandoned.

BACKGROUND OF THE INVENTION

1. Field of the Invention

This invention relates to a recording apparatus which is capable of recording sounds, such as a still video camera arranged to permit sound recording.

2. Description of the Related Art

The conventional apparatuses of the above stated kind are arranged to record images. When a photographing operation is performed with a magnetic disc inserted in a still video camera, images are recorded in tracks one after another. The magnetic disc is then taken out from the camera and is inserted in a still video recording and/or reproducing apparatus which has a sound recording function and performs sound recording in accordance with specifications for a still video floppy disc. A video floppy disc containing image and sound records in a synchronized state is obtained by that operation.

However, the conventional apparatus of the above stated kind is not arranged to set apart, during the photographing operation, some sound recording tracks for after recording. In case where after recording of sounds is expected, therefore, the photographer has been required to leave a certain required amount of tracks unrecorded. This is a disadvantage in respect to the operability of the apparatus. Although it is possible to have some unnecessary image (video) tracks erased by means of the still video recording and/or reproducing apparatus and to use these tracks as sound tracks for after recording. However, if there is not many or no unnecessary image tracks, the sound recording is impossible.

SUMMARY OF THE INVENTION

In view of the above stated problem of the prior art, it is an object of this invention to provide a recording apparatus which is arranged to adequately permit the above stated after recording as necessary.

It is another object of the invention to provide a recording apparatus which is arranged such that, in recording a video signal, some recordable area can be set apart for recording information corresponding to the video signal recorded.

Under this object, a recording apparatus which is arranged according to the invention as a preferred embodiment thereof to record a video signal on a recording medium is provided with sound recording track setting means for setting sound recording tracks by recording a predetermined signal in the sound recording tracks during the process of video signal recording.

It is a further object of the invention to provide a recording and/or reproducing apparatus which is arranged such that, in cases where some sound recording or sound storage blocks are found on a storing means in recording or reproducing in or from the storage blocks of the storing means, the operation mode of the apparatus is appositely variable according to the presence or absence of the sound recording (or storing) blocks.

Under that object, a recording and/or reproducing apparatus arranged as a preferred embodiment of the invention to record or reproduce video and audio signals in or from the recording blocks of a recording medium is provided with sound recording block discriminating means which discriminates each sound recording block from others when an identification (ID) signal indicative of a block set for recording sounds is detected from the block.

Further, it is an object of this invention to provide a recording apparatus which has a novel function.

Other objects and features of this invention will become apparent from the following detailed description of embodiments thereof taken in connection with the accompanying drawings.

DETAILED DESCRIPTION OF THE PREFERRED EMBODIMENTS

Figure 1:
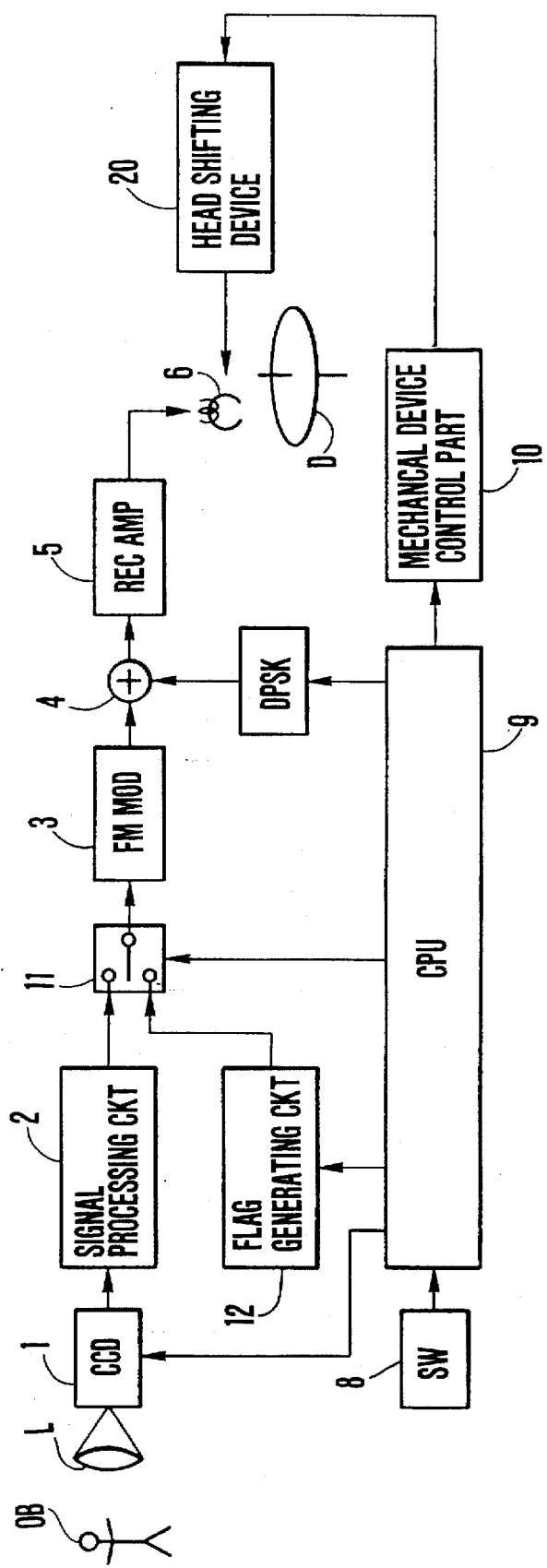
FIGS. 1 and 2 are block diagram and a flow chart respectively showing a first embodiment of this invention.
Figure 2:
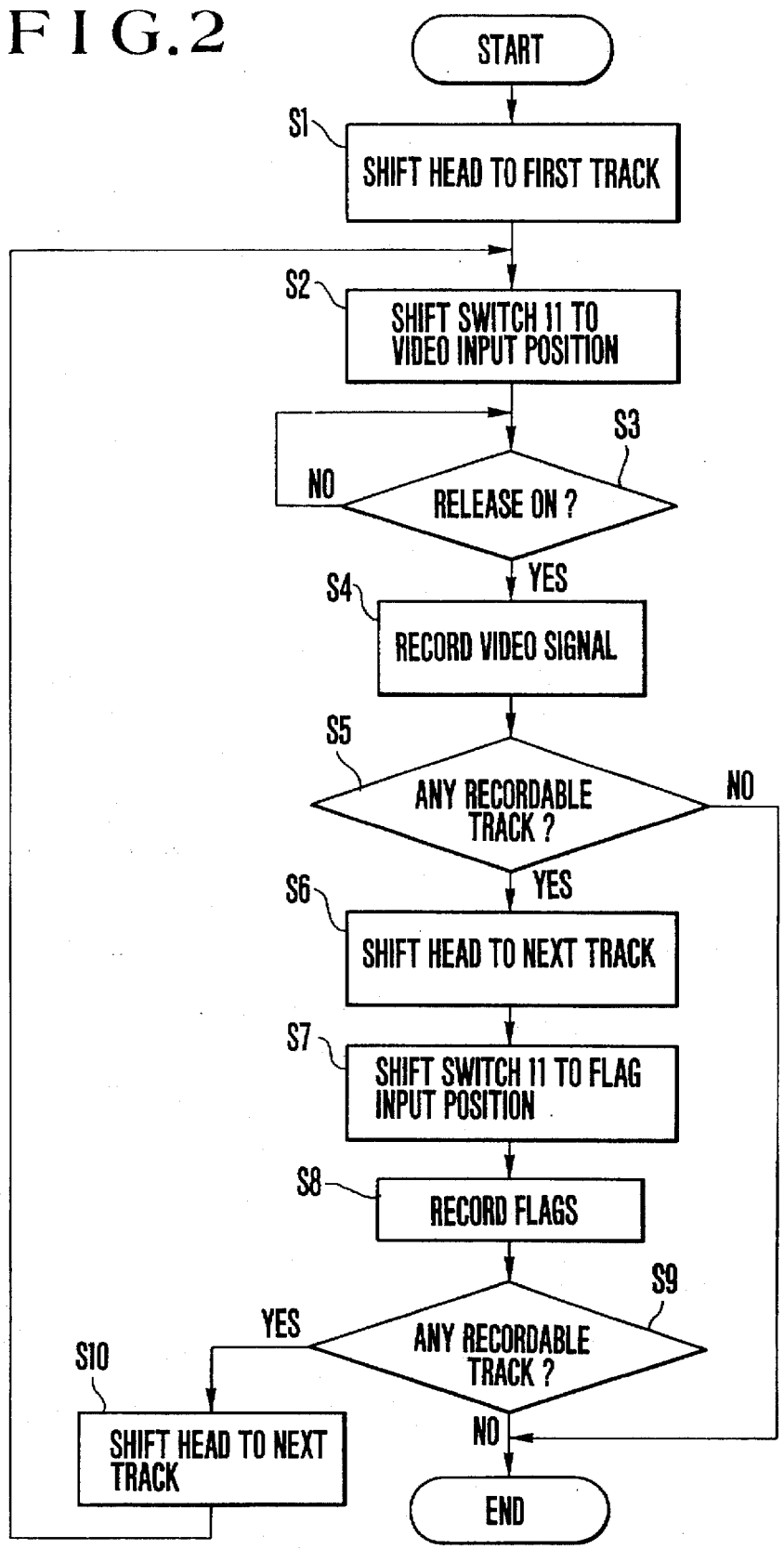

FIG. 1 shows in a block diagram a recording apparatus which is arranged according to this invention as a first embodiment thereof. FIG. 2 shows the same apparatus in a flow chart. The recording operation for a chrominance signal is omitted from description for the sake of simplification of the following description:

Referring to FIG. 1, a photo-electric converting element 1 is a CCD or the like and is arranged to convert into an electrical signal an object's image OB which is obtained via a lens L. This signal is read out under the control of a CPU 9. A signal processing circuit 2 is arranged to perform a clamping process, luminance-separating and color-separating processes, etc., on the signal from the CCD 1 to make it into a signal suited for recording. A frequency modulator 3 is arranged to frequency modulate a signal coming via a switch 11. An addition circuit 4 is arranged to add together a modulated ID signal coming from a DPSK circuit 7 which will be described later and a signal which is modulated by the frequency modulator 3. A recording amplifier 5 is arranged to amplify the output of the addition circuit 4. A recording head 6 is arranged to have its position relative to a magnetic disc D which is a recording medium controlled by a head shifting device 20. A DPSK circuit 7 is arranged to DPSK (differential phase shift keying) modulate an ID signal coming from the CPU 9. A switch group 8 is arranged to produce an instruction for recording, on the disc D, the signal from the CCD 1 and includes a shutter release switch. The switch group 8 controls a switch 11 to cause the latter to supply the signal of CCD 1 to the frequency modulator 3. The CPU 9 is arranged to control each of the components of the apparatus indicated in blocks in accordance with the instructions coming from the switch group 8. A mechanical device control part 10 is arranged to control a head shifting device 20 and includes a driver for shifting the position of the head 6 on the disc D. The head shifting device 20 includes a motor which is arranged to be driven by the driver included in the mechanical device control part 10. A flag generating circuit 12 is arranged to generate flags.

Referring to FIG. 2 which is a flow chart, the apparatus which is arranged as described above operates as follows: At a step S1: When the magnetic disc D (or a video floppy disc) is inserted in the apparatus, the CPU 9 produces a control signal to instruct the mechanical device control part 10 to have the head 6 shifted to the first track which is, for example, located in the outermost part of the disc D. At a step S2: Meanwhile, the switch 11 is instructed by the CPU 9 to select the output of the signal processing circuit 2. At a step S3: Among the switch group 8, the (shutter) release switch is pushed. At a step S4: A shutter which is not shown opens. An optical image formed on the CCD 1 by the lens L is produced by the CCD 1 in the form of an electrical signal in synchronism with the rotation of the disc D. The signal is recorded on the disc D by the head 6 coming through the signal processing circuit 2, the switch 11, the frequency modulator 3, an addition circuit 4 and the recording amplifier 5. The CPU 9 supplies an ID code to the DPSK (differential phase shift keying) circuit 7. The DPSK circuit 7 modulates this code into an ID signal. The ID signal is supplied to the addition circuit 4 to be superimposed on the video signal in synchronism therewith. At a step S5: Upon completion of image (or video signal) recording, a check is made for remaining recordable tracks. If there remains any next recordable track, the flow of operation proceeds to a step S6. Step S6: The head is shifted to the next track. At a step S7: The switch 11 shifts its position to produce the output of the flag generating circuit 12.

Figure 3:
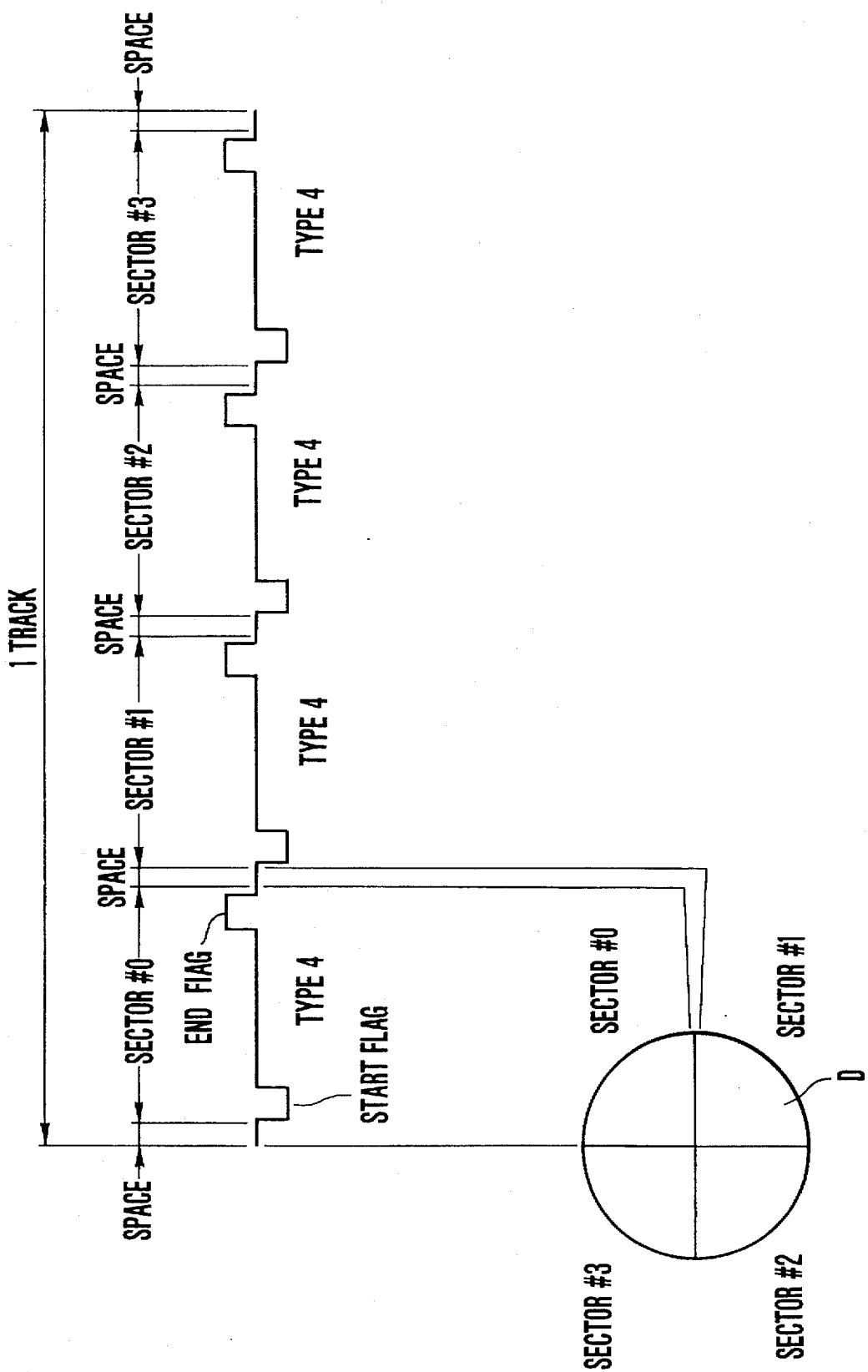
FIG. 3 schematically shows, in relation to a video floppy disc, flags which are recorded thereon by the same embodiment for setting tracks for after recording.

In accordance with the sound recording format provided by the applicable standard specifications for still video floppy discs as shown in FIG. 3, the flag generating circuit 12 generates start and end flags for a sector which corresponds to a sector type 4. At a step S8: The start flags and the end flags are generated in synchronism with the rotation of the disc D for a period of one track which consists of four sectors. The combination of the start and end flags corresponding to the type 4 indicates that no audio signal is recordable in any sectors that are provided with these flags. The flag signal is supplied to the head 6 via the modulator 3, the addition circuit 4 and the recording amplifier 5 to be recorded on the disc D by the head 6. At that time, no signal is supplied from the DPSK circuit 7 to the addition circuit 4. Upon completion of recording the start and end flags which correspond to the type 4, the flow comes to a step S9. Step S9: A check is made to see if there remains any recordable track. If so, the flow proceeds to a step S10. Step S10: The head 6 is shifted to a next track. The CPU 9 then causes the switch 11 to shift its position to allow the output of the signal processing circuit 2 to be produced. After that, the flow of operation is repeated in the same manner. In case that no remaining recordable track is found at the step S9, it means completion of recording. Then, the end of photographing is displayed by a display device which is not shown. The operation described ensures that the tracks required for after recording are set apart without fail during the recording operation.

Figures 9, 10:
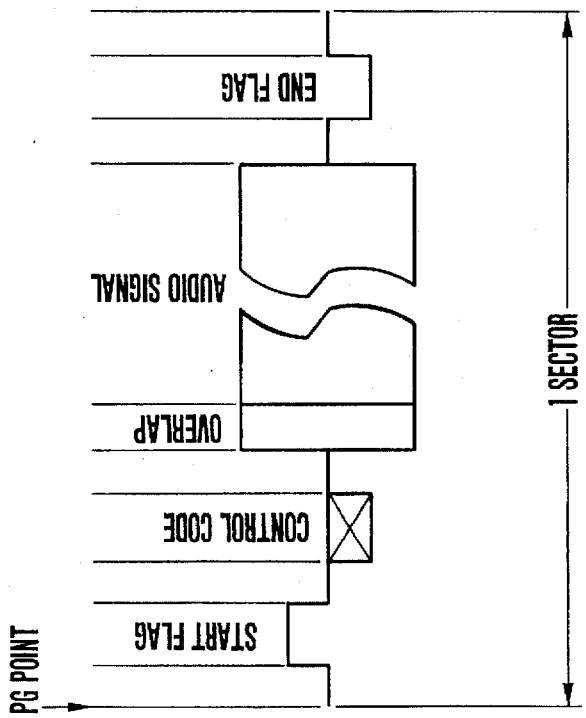
FIG. 9 is a schematic illustration of signal allocation within each sector.
FIG. 10 is a table showing a manner in which sectors are used as in relation to flags.

FIG. 3 shows the audio signal recording format employed for recording an audio signal on a video floppy disc D. A plurality of concentric circular tracks are formed on the video floppy disc D. Each of these tracks are divided into four sectors #0 to #3 as shown on the lower left side in FIG. 3. To each of the four sectors of each track are added the start and end flags to indicate the boundaries between one sector and another. In the video floppy disc format illustrated, the start and end flags are arranged to indicate, by combinations of polarity, whether the audio signal part recorded in each sector is continuing to the next sector or to the next track and also whether the sector is of a sector type 4 which is unrecorded with any audio signal and unused. This is also shown in FIG. 10 which will be referred to later herein.

Figure 4:
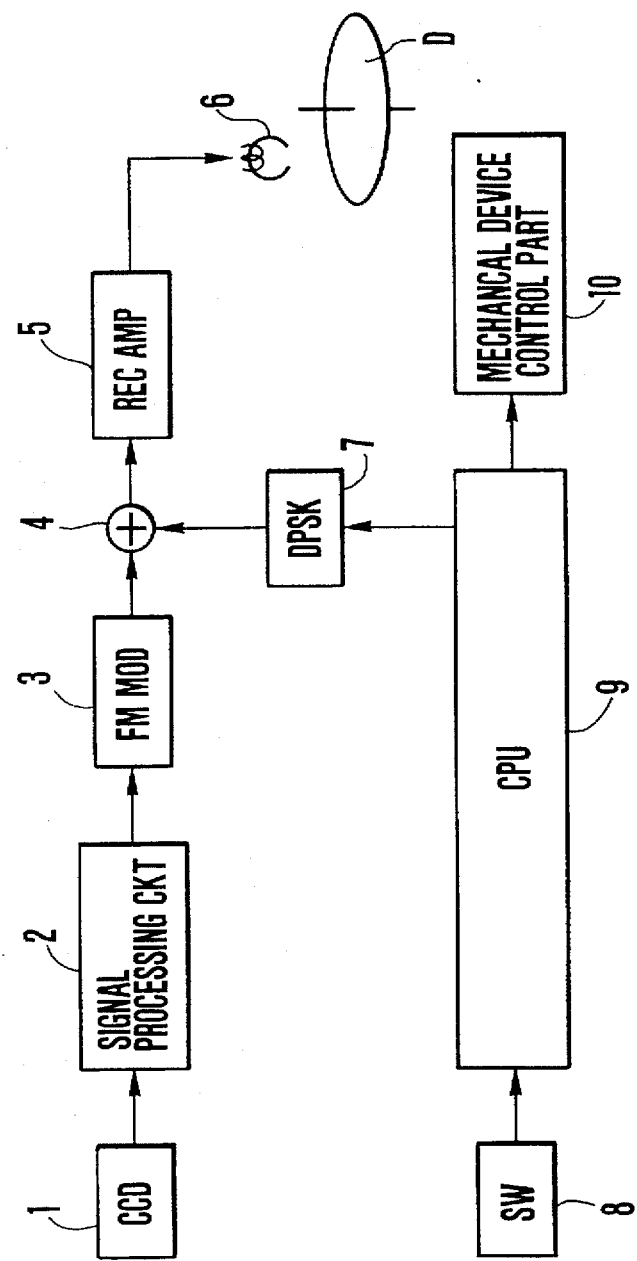
FIGS. 4 and 5 are block diagram and a flow chart respectively showing a second embodiment of the invention.
Figure 5:
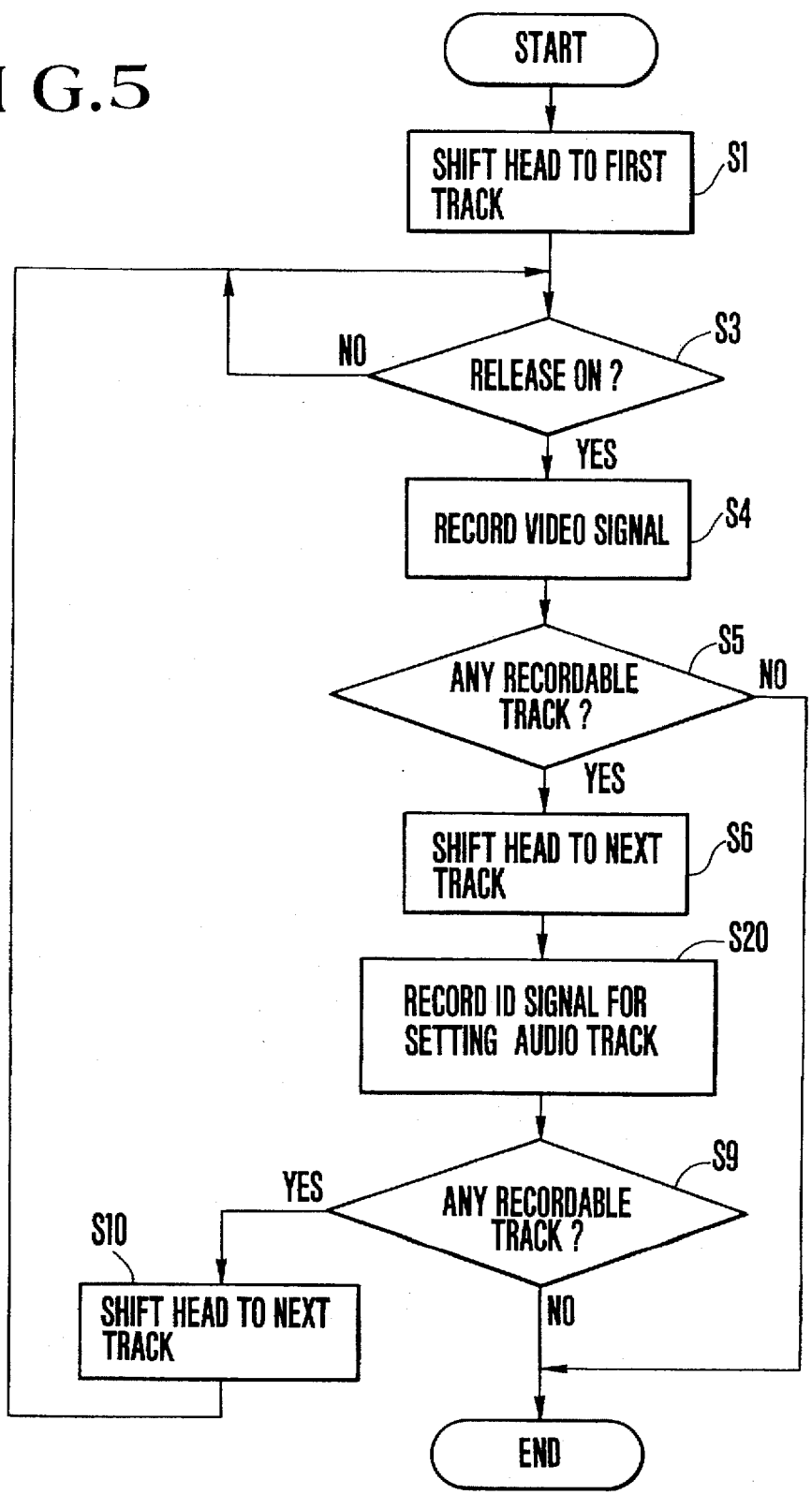

FIG. 4 shows in a block diagram a second embodiment of this invention. FIG. 5 is a flow chart showing the operation of the second embodiment. Like the first embodiment, description of chrominance signal recording is omitted from the following description.

In the case of the second embodiment, instead of recording the above stated start and end flags, a user's area included in the ID code of a format preset for recording along with a signal is employed. A code is set within the area to show that the track is set apart for after recording and is recorded along with a video signal. This code is recorded by a DPSK circuit 7 at a step S20 of a flow chart shown in FIG. 5.

In both the first and second embodiments, the head 6 may be arranged either for field recording or frame recording. In the case of frame recording, a head change-over switch is additionally provided for video signal recording in two consecutive tracks before setting the after-recording track. It is also possible to provide an after-recording track setting switch for switching the recording apparatus between a recording mode and an unrecording mode.

In accordance with the arrangement of the second embodiment as described above, the still video camera is provided with means for setting the after-recording tracks. This enables the camera to set apart the tracks for after recording without fail during the process of photographing. The embodiment thus solves the problem of the conventional camera that the photographer is compelled to take the trouble of precalculating and leaving a number of tracks unrecorded for some audio signal that is to be recorded later on. The embodiment thus effectively prevents sound recording tracks from being used up for image recording, so that sound recording can be accomplished without fail.

Figure 6:
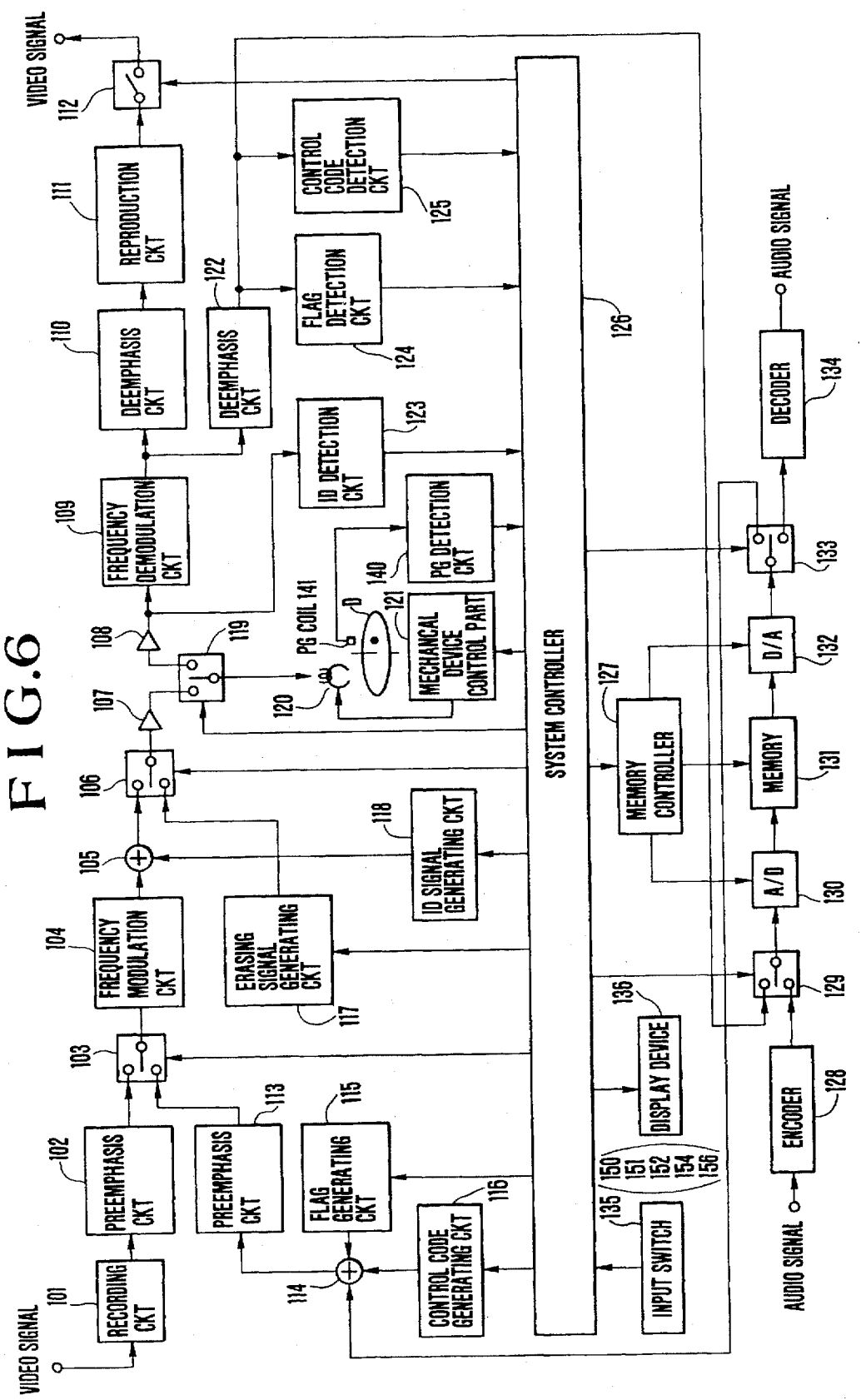
FIG. 6 is a block diagram showing a third embodiment of the invention.

A third embodiment of the invention is arranged to ensure after recording by discriminating each of after-recording tracks from others when the track is found to have been set as an after-recording track. The third embodiment is described below with reference to FIG. 6:

Referring to FIG. 6, a recording circuit 101 is arranged to process a video signal input into a signal form suited for recording. Preemphasis circuits 102 and 113 are arranged to preemphasize the output of the recording circuit and that of an adder 114 respectively. A switch circuit 103 is arranged to select either a signal produced from the preemphasis circuit 102 or a signal produced from the other preemphasis circuit 113. A frequency modulation circuit 104 is arranged to frequency modulate the signal selected by the switch circuit 103. An adder 105 is arranged to add together the signal modulated by the frequency modulation circuit 104 and an ID signal which is produced from an ID signal generating circuit 118. A switch circuit 106 is arranged to supply an amplifier 107 with either a signal produced from the adder 105 or a signal produced from an erasing signal generating circuit 117 which is arranged to generate an erasing signal. An amplifier 108 is arranged to amplify a signal reproduced by a head 120. A frequency demodulation circuit 109 is arranged to frequency demodulate the signal amplified by the amplifier 108. Deemphasis circuits 110 and 122 are arranged to deemphasize with a given characteristic the signal demodulated. A reproduction circuit 111 is arranged to process deempasized, demodulated signals into a form suited for supplying them to a monitor. A muting circuit 112 is arranged to mute the output of the reproduction circuit 111. An addition circuit 114 is arranged to add together the output of a control code generating circuit 116 and that of a flag generating circuit 115. An erasing signal generating circuit 117 is arranged to generate the above stated erasing signal. An ID signal generating circuit 118 is arranged to generate an ID signal which is DPSK modulated. A switching circuit 119 is arranged to switch the signal produced from the head 120. A mechanical device control part 121 is arranged to cause the head 120 to be shifted from one position to another relative to the disc D. An ID detection circuit 123 is arranged to demodulated a DPSK demodulated signal included in the output of the amplifier 108. A flag detection circuit 124 and a control code detection circuit 125 are arranged to detect flags and control codes from the output of the deemphasis circuit 122 respectively. A system controller 126 is arranged to control the operation of each of the applicable parts of the apparatus. A memory controller 127 is arranged to determine the timing of writing and reading into and from an audio signal storing memory 131, to control the addresses of the memory 131 and to determine the converting timing of an A/D converter 130 and that of a D/A converter 132. An encoder 128 is arranged to process an audio signal input for reducing noise. A switch circuit 129 is arranged to supply either the signal produced from the deemphasis circuit 122 or the signal produced from the encoder 128 to the A/D converter 130. A switch circuit 133 is arranged to supply the signal produced from the D/A converter 132 either to the decoder 134 or to the adder 114. A decoder 134 is arranged to process the output of the D/A converter 132 for reducing noise.

The memory controller 127 changes the time base of the audio signal input by changing speeds at which the audio signal is written in and read out from the memory 131. More specifically, in writing the audio signal into the disc D, the time base of the audio signal is compressed. In reading, the time base of the audio signal is expanded. An input switch 135 is arranged to receive various operation instructions which will be described later on. A display device 136 is arranged to display the operating state of the apparatus. A PG detection circuit is arranged to detect the rotation phase of the disc D by detecting, through the output of a PG coil 141, a magnetized piece which is buried at a given phase point in the disc D.

Referring to FIG. 9, the start flag and the control code are arranged to be recorded in positions at some distances from a PG point. Accordingly, the flag generating circuit 115 and the control code generating circuit 116 are arranged to generate the flags and the control code (see FIG. 9) according to a timing signal and data produced from the system controller 126 on the basis of the rotation phase of the disc D as detected by the PG detection circuit 140. Further, a flag detection circuit 124, a control code detection circuit 125 and an ID detection circuit 123 are arranged to detect signals related to them respectively on the basis of the rotation phase of the disc D detected by the PG detection circuit.

The various parts of the reproduction system included in this embodiment operate as described below:

The system controller 126 causes the mechanical device control part 121 to shift the head 120 to a predetermined track on the disc D. A signal reproduced by the head 120 is supplied via the change-over switch 119, the preamplifier 108 and the frequency demodulation circuit 109 to the deemphasis circuits 110 and 122. The output of the preamplifier 108 is also supplied to the ID detection circuit 123. The output of the deemphasis circuit 122 is supplied to the flag detection circuit 124, the control code detection circuit 125 and the change-over switch 129.

The flag detection circuit 124 detects the flags indicative of the used states of the sectors of each of the audio signal track. Further, each of these sectors is arranged in a manner as shown in FIG. 9. The above stated flags include a start flag which is located at the fore end of the sector and an end flag which is located at the rear end of the sector. The used state of each sector is indicated by the polarity combination of the two flags as mentioned in the foregoing. Different polarity combinations made for this purpose and their implications are as shown in FIG. 10. The video and audio tracks are distinguishable from each other during reproduction by detecting these flags, which also show the used states of the sectors of each track.

Figure 7:
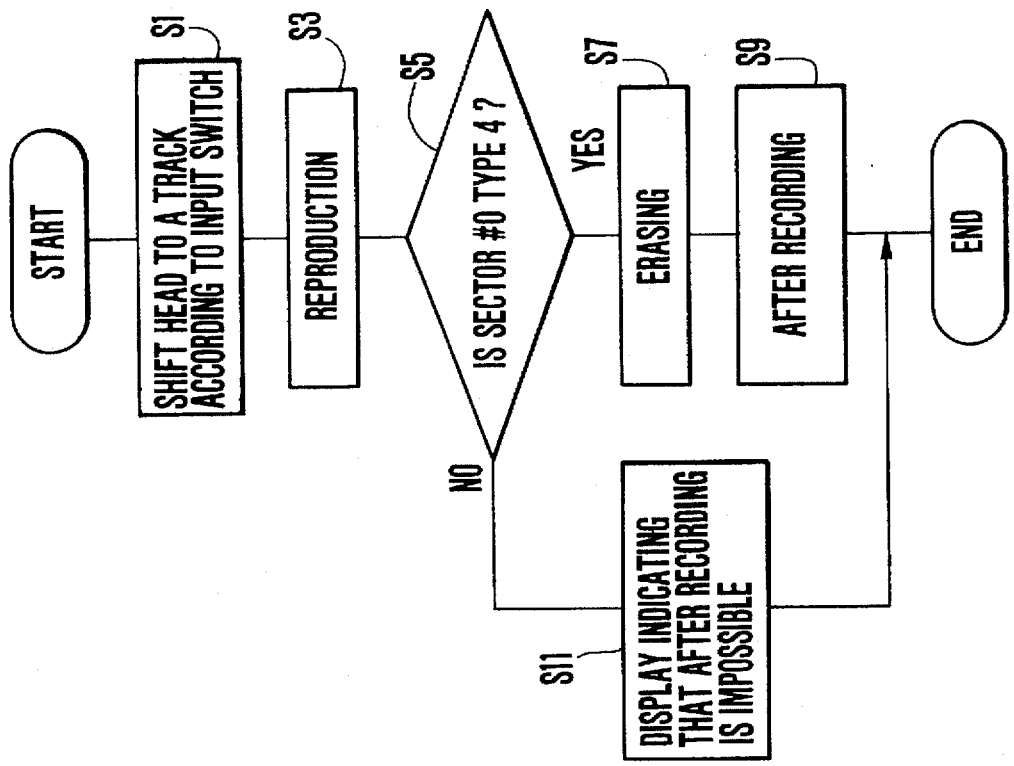
FIG. 7 is a first flow chart showing the operation of the third embodiment.

Referring to FIG. 7, the after recording operation of this embodiment is as follows: When the disc D, i.e. the video floppy disc, is inserted in the apparatus, in response to the operation of the input switch 135, the system controller 126 causes the mechanical device control part 121 to shift the head 120 to an applicable track, at a step S1. A reproducing operation is then performed in the manner as described in the foregoing. A reproduced signal is supplied to the flag detection circuit 124, at a step S3. At a step S5: A flag detection signal is produced from the flag detection circuit 124 and is supplied to the system controller 126. The system controller 126 then makes a check to see if the sector #0 of the track currently accessed for reproduction is type 4. If not, the flow of operation comes to a step S11. At the step S11: The system controller 126 causes the display device 136 to make a display indicating that the currently accessed track is not usable for after recording. In case that the sector #0 is found to be of the type 4 at the step S5, the flow proceeds to a step S7. Step S7: The change-over switch circuit 106 is shifted to a position for the erasing signal generating circuit 117. Then, the head 120 is caused to erase the contents of this track through the recording amplifier 107 and the switch circuit 119. At a step S9: After completion of or during the process of or before or after the process of the erasing action, an audio signal which is stored at the memory 131 via the change-over switch 129 and the A/D converter 130 is read out from the memory 131 in synchronism with the rotation of the floppy disc. The audio signal thus read out is supplied via the D/A converter 132, the switch 133, the addition circuit 114, the frequency modulation circuit 104, the addition circuit 105 and the circuit elements 106, 107 and 119 to the head 120 to be recorded in this track (after recording). The adder 114 adds together the flags and the the control code which indicates corresponding image (video) signal.

A track having the flags of the type 4 in the sector #0, which is located foremost in the track, indicates as mentioned in the foregoing that the foremost sector is not used. In that instance, the track is considered to be not a video track and to contain no audio signal record there. This embodiment is provided with means for determining the track to be usable for after recording under such a condition. This arrangement permits advantageous use of the track.

In recording images either by means of a still video camera or a video floppy disc recorder, for example, if the flags of the type 4 are recorded in all the four sectors of a track coming next to a video track, after recording tracks can be preserved without fail during the process of image recording.

The above stated method of discriminating after-recording tracks from others by checking tracks to see if the sector #0 of each track is of the type 4 may be replaced with a method of checking all the four sectors including not only the sector #0 but also the sectors #1, #2 and #3 to see if every one of them is of the type 4. Any combination of sectors to be checked is acceptable so long as they include the sector #0.

Figure 8:
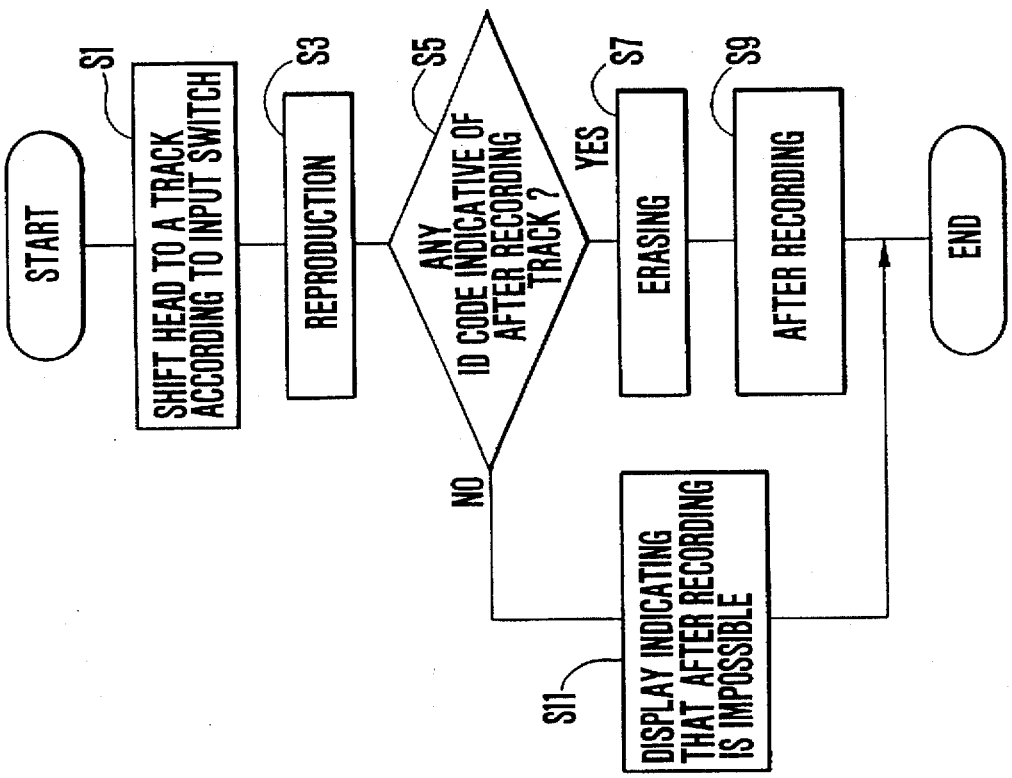
FIG. 8 is a second flow chart of the same embodiment.

FIG. 8 is a second flow chart showing the operation of the third embodiment described above. In the case of the flow chart shown in FIG. 7, the discrimination of after-recording tracks from others is made by the medium of the flags provided for audio signal recording. Whereas, in this case, a method of making the discrimination through a user's area of the ID signal provided for video signal recording is employed. Referring to FIG. 8, the head 120 is shifted, at a step S1, in the same manner as in the first flow chart. At a step S3: The record is reproduced from the track. The output of the head 120 is supplied to the ID detection circuit 123 via the switch circuit 119 and the amplifier 108. At a step S5: The ID code is detected by the ID detection circuit 123 and is supplied to the controller 126. The controller checks the ID code for the presence of a prescribed signal within the user's area of the ID code. If such a signal is found there, the erasing process is performed and then an after-recording action is performed at steps S7 and S9 respectively. If not, a display is made at a step S11 indicating that after recording is impossible.

In recording an image by means of a still video camera or a video floppy disc recorder, like in the case of the first flow chart, a signal indicating the existence of an after-recording track is recorded in a prescribed manner within a user's area of the ID code provided in a track which is, for example, ensuing a video signal record track. During the process of recording, this arrangement unfailingly sets apart necessary tracks for after recording.

In both cases of the first and second flow charts, an after-recording action is performed by discriminating after-recording tracks. However, the flow of operation of course may be change to perform only the discrimination of the after-recording tracks without carrying out the erasing and recording actions. The embodiment also can be arranged to prevent a reproducing action on a after-recording track when the after-recording track is detected during reproduction from a video floppy disc.

Further, the embodiment may be modified in such a way as to be automatically brought into a recording standby state upon detection of an after-recording track and to be kept waiting for a next operation thereon even during the process of recording.

Figure 11:
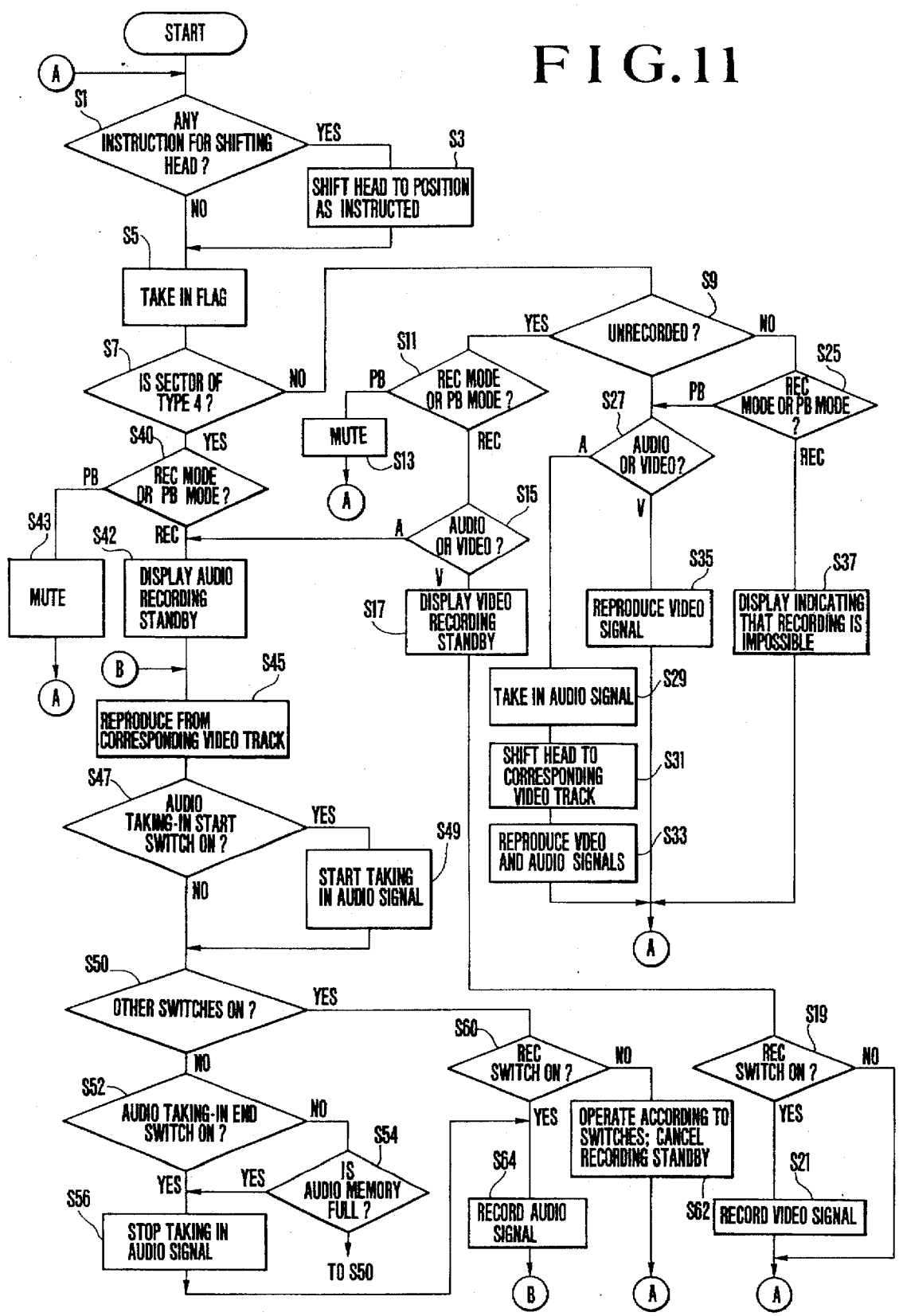
FIG. 11 is a third flow chart showing the operation of the third embodiment shown in FIG. 6.

FIG. 11 shows in a flow chart the above stated modification of the embodiment. Before describing the flow chart, the details of the input switch 135 which is connected to the system controller 126 is described as follows: The switch 135 is provided with an up-down key for controlling the access position of the head 120 relative to the disc D; a mode selection switch 150 for setting the apparatus either in a recording mode (REC mode) or in a reproduction mode (PB mode); an AUDIO ON switch 151 for allowing image recording and reproduction with sounds; a recording (REC) switch 152 for recording either an audio signal stored in the memory 131 or an incoming video signal on the disc D; a taking-in start switch 154 for allowing an audio signal to begin to be taken into the memory; and a taking-in end switch 156 for bringing the audio signal taking-in operation on the memory 131 to a stop.

Referring now to FIG. 11, at a step S1: A check is made to see if a head shifting instruction has been received. If so the flow of operation comes to a step S3. At the step S3: The head 120 is shifted to a designated position. At a step S5: The flag detection circuit 124 is operated to take in the flags provided in the four sectors on the track. At a step S7: The flags are checked to see if these sectors are of the type 4. If not, the flow comes to a step S9. At the step S9: The track is checked to see if it is recorded. If not, the flow comes to a step S11. At the step S11: A discrimination is made between the REC (recording) mode setting and the PB (reproduction) mode setting of the apparatus. In the case of the PB mode, the flow comes to a step S13. At the step S13: a video signal is muted by means of the mute circuit 112. If the apparatus is found to be in the REC mode, the flow comes to a step S15. At the step S15: The AUDIO ON switch 151 is checked to see if it is in an on-state. If so, the flow branches off to a step S42. If not, the flow comes to a step S17. At the step S17: The display device is caused to make a display showing that video signal recording is possible. Then, at a step S19: The REC switch 152 is check to see if it is in an on-state. If so, the flow comes to a step S21. At the step S21: A video signal obtained is recorded on the disc D by the head 120. If the REC switch 152 is found to be not in the on-state at the step S19, the flow comes back to the step S1.

In case that the currently accessed track is found to contain a record at the step S9, a discrimination is made between the PB and REC modes like at the step S11. If the apparatus is found to be in the PB mode, the flow comes to a step S27. At the step S27: The AUDIO ON switch 151 is checked to see if it is in the on-state like at the step S15. If so, the flow comes to a step S29. At the step S29: An audio signal recorded on the disc D is reproduced and is temporarily taken into the memory 131. Then the flow proceeds to a step S31. At the step S31: The head 120 is shifted to a video signal record track corresponding to the above stated audio signal record. At a step S33: The video signal of the track accessed at the step S31 is reproduced while reading the temporarily stored audio signal out of the memory 131.

If the AUDIO ON switch 151 is found to be not in the on-state at the step S27, the flow comes to a step S35. At the step S35: The video signal is reproduced from the video signal record track. If the apparatus is found to be in the REC mode at the step S25, the flow comes to a step S37. At the step S37: A display is made to show that no recording is possible.

In case that the signal recorded in the track to which the head 120 have had access at the step S29 is found to be a video signal having no corresponding audio signal, the video signal is alone reproduced as it is.

Next, in case that all the four sectors of the track accessed on the disc D at the step S7 are provide with the flags of the type 4, the flow proceeds to a step S40. At the step S40: A discrimination is made between the REC and PB modes. If the apparatus is found to be in the PB mode, the flow comes to a step S43. At the step S43: A muting action is performed like at the step S13 and the flow comes back to the step S1. If the apparatus is found to be in the REC mode, the flow comes to a step S42. At the step S42: The display device 136 is automatically caused to make a display showing that the apparatus is in a standby state for audio signal recording. At a step S45: The head 120 is shifted to a video signal record track corresponding to the track in which the flags of type 4 are recorded. The video signal record is reproduced. The flow then comes to a step S47. At the step S47: The audio signal taking-in start switch 154 is checked to see if it is in an on-state. If so, the flow comes to a step S49. At the step S49: The audio signal begins to be taken into the memory 131. If the switch 154 is found to be not in the on-state at the step S47, the flow comes to a step S50. At the step S50: Other switches are checked to see if they are in on-states. If not, the flow comes to a step S52. At the step S52: The audio signal taking-in end switch 156 is checked to see if it has been turned on. If not, the flow comes to a step S54. At the step S54: The address from the memory controller 127 to the memory 131 is checked to see if the capacity of the audio memory 131 is full. If so, the flow comes to a step S56. At the step S56: The process of taking the audio signal into the memory 131 is brought to a stop. Then, the audio signal taken into the memory is recorded on the disc D. If the memory 131 is found to be not full at the step S54, the flow comes back to the step S50. At the step S50, if some other switch is found to have been turned on, the flow comes to a step S60. At the step S60: A check is made to see if the switch is the REC switch 152. If so, the flow comes to a step S64. At the step S64: The audio signal written in the memory 131 is recorded on the disc D. The flow then comes back to the step S45.

With the flow of operation of FIG. 11 executed, the apparatus can be automatically brought into the audio signal recording standby state and this can be displayed when an after-recording track is found during the process of recording. This enables the operator to know the necessity for after recording without difficulty. Further, in the audio signal recording standby state, the video signal record which requires after recording is automatically reproduced by the head 120. Therefore, an after-recording action can be readily accomplished by the operator without any troublesome procedures.

Further, during reproduction, any signal that is read out from the track having the flags of the type 4 is muted to prevent the display of the monitor from being disturbed by an unnecessary signal.

In the case of the flow chart of FIG. 11, all the four sectors of each of the tracks to be designated as audio signal recording tracks are arranged to have the start and end flags of the type 4 recorded in combination there. However, this arrangement may be changed to designate the after-recording tracks (audio signal recording tracks) by some other signal instead of the use of the flags of the type 4.

In the embodiment described, a video signal representing a still picture and a given period portion of an audio signal to be reproduced in combination with the video signal are employed as an information signal and an additional information signal to be reproduced in combination with the information signal. The video floppy disc which is arranged to store in a commingled state a video signal and an audio signal which is in conformity with the applicable still video standard specifications is employed as storing means for storing these two signals. However, this invention is not limited to the apparatuses of that kind. Changes and variations may be made without departing from the spirit and scope of the invention as set out in the appended claims. The storing means may be a tape-shaped medium, a card-shaped medium. a semiconductor memory or may be a solid-state memory such as a Bloch line memory.

As described in the foregoing, the embodiment is provided with discriminating means for finding any sound recording tracks provided for after recording on a video floppy disc by detecting an identification signal indicative of a sound recording (after recording) track. Therefore, the after-recording tracks which are thus secured and put apart during a photographing operation can be effectively utilized.

While it has been a problem with the conventional apparatus that some necessary after-recording action becomes impossible for lack of unrecorded tracks or an insufficient number of unnecessary video signal record tracks, this problem can be solved by the embodiments of this invention described in the foregoing.

What is claimed is:

1. An information signal recording method for recording respectively a first information signal and a second information signal on at least a part of a plurality of recording areas provided on a recording medium, said second information signal being related to but different from said first information signal, comprising the following steps:

(a) a recording step of, in the case that a recording area other than a recording area having been recorded with the first information signal thereon is set as a recording area on which an after-recording operation is enabled to be performed on the second information signal related to the first information signal, the second information signal being recorded thereon after the first information signal has been recorded, when said first information signal is recorded on at least the part of the plurality of recording areas provided on the recording medium, recording on said recording area thus set an after-recording reservation signal indicating that an after-recording operation is enabled to be performed on the recording area;

(b) a searching-reproducing step of searching an after-recording reservation recording area having been recorded with said after-recording reservation signal thereon among the plurality of recording areas provided on the recording medium and reproducing a first information signal recorded on a recording area corresponding to the searched after-recording reservation recording area recorded with the after-recording reservation signal, prior to a recording operation of said second information signal when at the recording step an after-recording operation of said second information signal is performed to said recording medium in which said first information signal is recorded on at least the part of the plurality of recording areas; and (c) an after-recording step of recording said second information signal on the searched after-recording reservation recording area at the searching-reproducing step.

2. A method according to claim 1, wherein said first information signal is an image signal.

3. A method according to claim 1, wherein said recording medium is a disk-like recording medium.

4. A method according to claim 3, wherein said plural recording areas are provided in a form of concentric circles on the recording medium.

5. A method according to claim 1, wherein said second information signal is an audio signal.

6. An information signal recording method for recording respectively a first information signal and a second information signal on at least a part of a plurality of recording areas provided on a recording medium, said second information signal being related to but different from said first information signal, comprising the following steps:

(a) a recording step of, in the case that a recording area other than a recording area having been recorded with the first information signal thereon is set as a recording area on which an after-recording operation is enabled to be performed on the second information signal related to the first information signal, the second information signal being recorded thereon after the first information signal has been recorded, when said first information signal is recorded on at least the part of the plurality of recording areas provided on the recording medium, recording on said recording area thus set an after-recording reservation signal indicating that an after-recording operation is enabled to be performed on the recording area;

(b) a searching-reproducing step of searching an after-recording reservation recording area having been recorded with said after-recording reservation signal thereon among the plurality of recording areas provided on the recording medium and reproducing a first information signal having been recorded on a recording area corresponding to the searched after-recording reservation recording area, prior to a recording operation of said second information signal, when at the recording step an after-recording operation of said second information signal is performed on said recording medium in which said first information signal is recorded on at least the pan of the plurality of recording areas;

(c) a purging step of purging the after-recording reservation recording area thus searched at the searching-reproducing step; and (d) an after-recording step of recording said second information signal recorded on said after-recording reservation recording area thus purged at the purging step.

7. A method according to claim 6, wherein said first information signal is an image signal.

8. A method according to claim 6, wherein said second information signal is an audio signal.

9. A method according to claim 4, wherein said recording medium is a disk-like recording medium.

10. A method according to claim 9, wherein said plural recording areas are provided in a form of concentric circles on the recording medium.

* * * * *

UNITED STATES PATENT AND TRADEMARK OFFICE
CERTIFICATE OF CORRECTION

PATENT NO. : 5,737,478
DATED : April 7, 1998
INVENTOR(S) : Yamagishi et al.

It is certified that error appears in the above-identified patent and that said Letters Patent is hereby corrected as shown below:

Col. 12, line 4,   delete "pan"   and insert — part —.

Col. 12, line 15,  delete "claim 4"   and insert — claim 6 —.

Signed and Sealed this

First Day of September, 1998

Attest:

BRUCE LEHMAN

Attesting Officer      Commissioner of Patents and Trademarks